United States Patent [19]
Krupp

[11] Patent Number: 6,000,718
[45] Date of Patent: Dec. 14, 1999

[54] END CAP ASSEMBLY FOR AIRBAG INFLATOR

[75] Inventor: Robert M. Krupp, Royal Oak, Mich.

[73] Assignee: Automotive Systems Laboratory, Inc., Farmington Hills, Mich.

[21] Appl. No.: 08/950,613

[22] Filed: Oct. 15, 1997

Related U.S. Application Data

[60] Provisional application No. 60/040,213, Mar. 6, 1997.

[51] Int. Cl.⁶ .................................................. B60R 21/26
[52] U.S. Cl. .......................... 280/736; 280/741; 102/531
[58] Field of Search ..................................... 280/736, 741, 280/740, 742; 102/530, 531

[56] References Cited

U.S. PATENT DOCUMENTS

| | | | |
|---|---|---|---|
| 4,590,041 | 5/1986 | Hill | 280/741 |
| 5,350,193 | 9/1994 | Murashima et al. | 280/736 |
| 5,387,008 | 2/1995 | Lauritzen et al. | 280/736 |
| 5,556,439 | 9/1996 | Rink et al. | 280/740 |

*Primary Examiner*—Peter C. English
*Attorney, Agent, or Firm*—Lyon, P.C.

[57] ABSTRACT

A gas generator of an airbag passenger restraint device wherein the gas generator comprises a propellant tube having first and second end closures. The second end closure contains an end cap dual spring subassembly that substantially reduces the vibrations within the generator assembly and propellant. The liberation of fluorocarbons and other undesirable byproducts caused by end cap reactivity is eliminated by employing an inert end cap. By reducing the vibratory effect, inflator performance variability and noise level are substantially reduced.

2 Claims, 1 Drawing Sheet

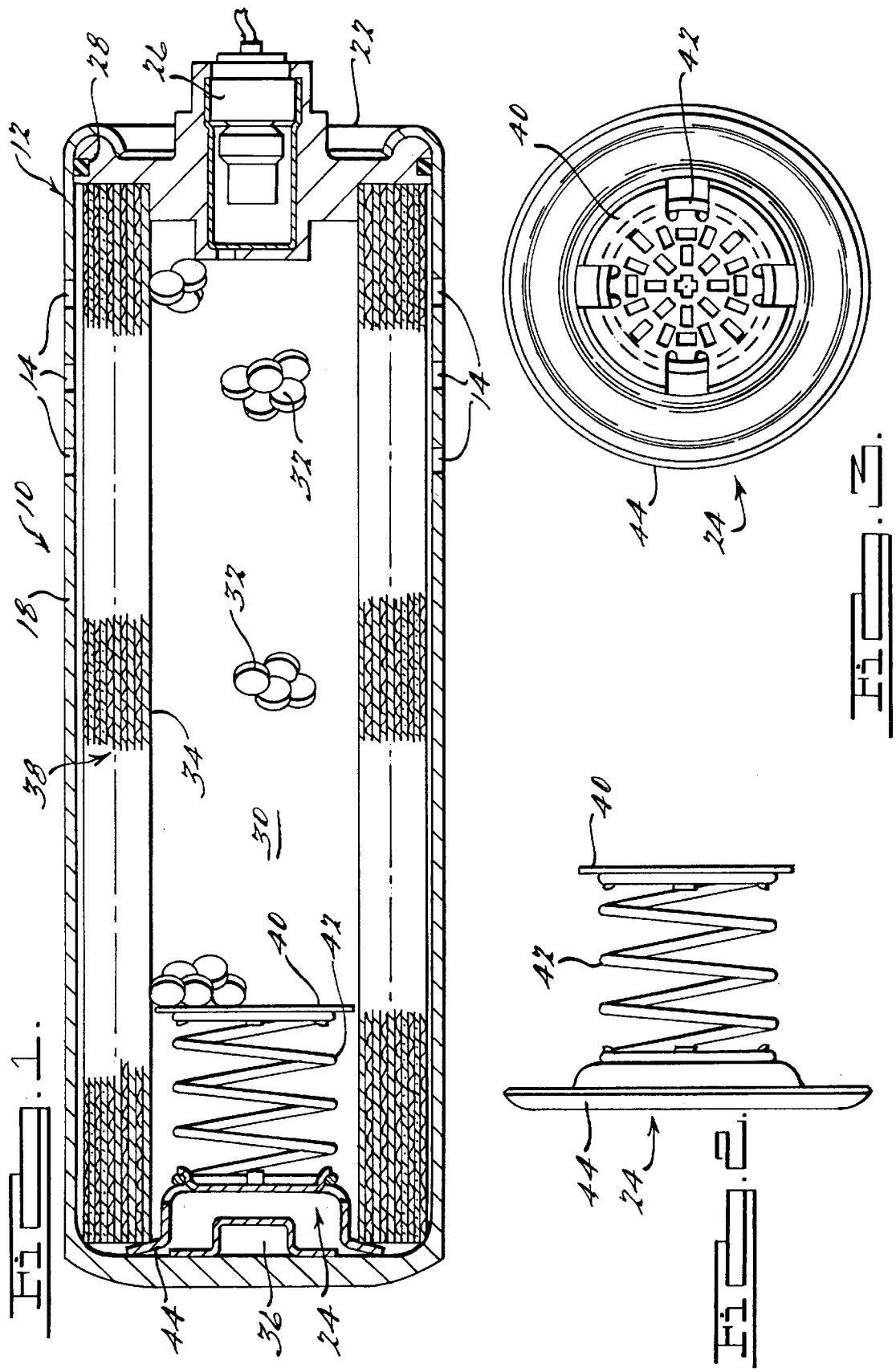

END CAP ASSEMBLY FOR AIRBAG INFLATOR

CROSS-REFERENCE TO RELATED APPLICATION

The present utility application is based on provisional Application Serial No. 60/040,213, filed on Mar. 6, 1997.

BACKGROUND OF THE INVENTION

The present invention generally relates to gas generators such as used to inflate air bags in an automobile occupant protection system, and more particularly to a gas generator having an improved end cap assembly.

Conventional gas generators are typically designed with an end closure integral to a housing on one end, and a second end closure at an opposite end. The outer housing of the generator usually encapsulates a filter, an ignition means, and a propellant bed. The second end closure is normally fixed to the housing once propellant grains have been inserted into the propellant chamber, thereby sealing the completed generator assembly.

One disadvantage is that the generator assembly often tends to rattle due to spatial gaps inherent within this design. As a result, the noise within the vehicle is increased. During operation of the vehicle, vibrations within the vehicle cause corresponding vibrations within the gas generator. Friction caused by continuous vibration of the generator assembly may lead to deterioration and failure of the o-ring(s) or other sealant means. Loss of the generator seal reduces the pressure of the propellant chamber upon combustion, and consequently, inhibits the ignition and combustion of the propellant grains upon collision. Loss of the hermetic seal may also result in a reduction of the propellant burn rate due to absorption of moisture within the propellant bed. Poor ignitability, a reduced burn rate, and poor sustained combustion lead to increased performance variability and a greater likelihood of inflator inoperability.

Performance variability may also be increased by fragmented propellant grains resulting from generator assembly vibrations. The propellant grains are shaped and sized to burn at a predetermined rate. Fragmentation of the propellant pellets skews the designed burn rate and interferes with continuous combustion within the propellant bed which in turn may adversely affect inflator operability.

The problem of vibration has been previously addressed by incorporating an integral end closure comprising a polymer seal and spring subassembly. The spring applies a constant pressure axially parallel to the propellant bed thereby dampening the vibration within the bed. The polymer based seal ensures that the combustion gases flow through their predetermined path rather than through gaps that may have remained in the crimped end closure. Without the seal, welding, as opposed to crimping, is necessary to close the gaps and prevent "blowby". Consequently, manufacturing costs are increased.

Although the end closure comprising the polymer seal and spring assembly represents an improvement over conventionally designed generators, it too has its disadvantages. For example, certain polymer or silicone based seals react with the heat of combustion resulting in the release of fluorocarbons and in the production of other undesirable gases. Furthermore, the generator assembly vibrations are not significantly dampened by the spring assembly and as such, potential o-ring failure as well as increased noise are still cause for concern.

Therefore, a need still exists for a gas generator that is resistant to vibration, is environmentally sound, and has reduced performance variability.

SUMMARY OF THE INVENTION

An end cap dual spring assembly for an airbag inflator, in accordance with the present invention, combines the benefits of vibration dampening, component dimensional stack height adjustment, and filter locating into one subassembled component. The assembly consists of a stamped metal bellville spring, a standard music wire compression spring, and a perforated metal disc.

BRIEF DESCRIPTION OF THE DRAWINGS

FIG. 1 is a longitudinal cross-sectional view of a conventional gas generator comprising an end cap dual spring subassembly, in accordance with the present invention.

FIG. 2 is a side view of an end cap dual spring subassembly, in accordance with the present invention.

FIG. 3 is a top view of one end of the end cap dual spring subassembly comprising a perforated disc.

DETAILED DESCRIPTION OF THE PREFERRED EMBODIMENT(S)

As seen in FIG. 1 of the drawings, an inflator 10 having particular utility for use in, for example, an automobile occupant restraint system, comprises a cylindrical housing 12 having a plurality of gas discharge orifices 14 disposed in a radially outer wall 18. In accordance with an exemplary embodiment of the present invention, the housing 12 has a first end closure 22 and an end cap spring subassembly 24 at an opposite end thereof that are both crimped or clamped in place. An o-ring 28 provides proper sealing. A perforated propellant tube or chamber 30 is centrally and longitudinally disposed within housing 12. End closure 22 accepts a conventional igniter 26, which initiates combustion of a propellant 32 within chamber 30 in a manner well known to one skilled in the art. A burst foil 34 may be provided along the inner wall of perforate chamber 30, thereby facilitating pressure buildup and flame front propagation through the propellant 32.

If desired, an autoignition assembly 36 is also disposed in propellant chamber 30, adjacent to the end cap dual spring subassembly 24, and functions as an auxiliary igniter. A filter assembly 38 is positioned radially outwardly about chamber 30 and provides a means for filtering and cooling the combustion gases. Stated in another way, a radially inner wall of filter 38 constitutes a perforate outer wall of tube or chamber 30. When crimped or clamped in place, subassembly 24 "filter locates" or radially centers filter 38 within housing 12.

In accordance with the present invention, FIG. 2 illustrates the end cap dual spring subassembly 24. A disc 40, preferably but not necessarily perforated, is connected to a first end of a compression spring 42. A stamped bellville spring plate 44 is comprised of flat carbon steel or other similarly suitable material, and is connected to a second end of spring 42, thereby retaining the helical coil spring 42.

Subassembly 24 dampens the generator vibration in two ways. First, the coiled spring 42 and disc 40 compressively hold the propellant 32 in place thereby preventing propellant fragmentation. Secondly, spring 44 and coiled spring 42 compressively hold the filter 38 and other generator components in place, thereby eliminating rattling and o-ring deterioration due to vibration. By virtue of its dual spring combination, the assembly 24 will accommodate gas generators and filters of different lengths, and will stabilize propellant beds of different longitudinal depths. Furthermore, the crimped or clamped end cap assembly 24 sufficiently seals the inflator to prevent "blowby" without the need for welding. Not only are the manufacturing costs therefore reduced, but upon combustion there is no release of undesirable byproducts in contrast to the polymeric end cap described above.

The bellville spring plate 44 is obtainable from, for example, P-K Tool & Manufacturing Co. located in Chicago, Ill. The disc 40 and the compressed coiled spring 42 are obtainable from, for example, Twist Inc. located in Jamestown, Ohio. The inflator 10 is manufactured by means well known to those skilled in the art. By way of example, the teachings of co-owned U.S. Pat. No. 5,727,813, entitled "AIR BAG INFLATOR", are herein incorporated by reference. As with other designs, the end cap assembly described hereinabove may be used in lieu of the integrated end closure described in the referenced application.

It will be understood that the foregoing description of the preferred embodiment of the present invention is for illustrative purposes only, and that the various structural and operational features herein disclosed are susceptible to a number of modifications, none of which depart from the spirit and scope of the present invention as defined in the appended claims.

I claim:

1. In a gas generator of an air bag passenger restraint device comprising an elongated and perforated cylindrical housing having a longitudinal axis and first and second ends, an elongated and perforated cylindrical filter radially extending about the axis of said housing and having first and second ends communicating with the first and second ends of said housing, respectively, a perforated propellant chamber disposed centrally of said filter and having first and second ends laterally aligned with the first and second ends of said filter, respectively, a propellant in said propellant chamber, means for igniting said propellant, and a first end closure closing the first end of said propellant chamber, an improved end cap subassembly for closing the second end of said propellant chamber comprising:

an axially slidable disc spaced substantially from the second end of said housing extending laterally of said propellant chamber in juxtaposed relation to said propellant;

a compression spring in communication with said disc and extending toward the second end of said housing, for placing a compressive bias on said disc and said propellant; and a second spring extending between said compression spring and the second end of said housing placing a compressive bias on the second end of said filter and said compression spring.

2. The inflator of claim 1 wherein said disc is perforated.

* * * * *